3,006,369
FLUID PRESSURE DISTRIBUTOR VALVE
Michael A. De Corte, Phoenix, Ariz., and Robert O. Dameron and Robert P. Zundel, Detroit, Mich., assignors to Ford Motor Company, Dearborn, Mich., a corporation of Delaware
Filed Dec. 29, 1958, Ser. No. 783,285
8 Claims. (Cl. 137—620)

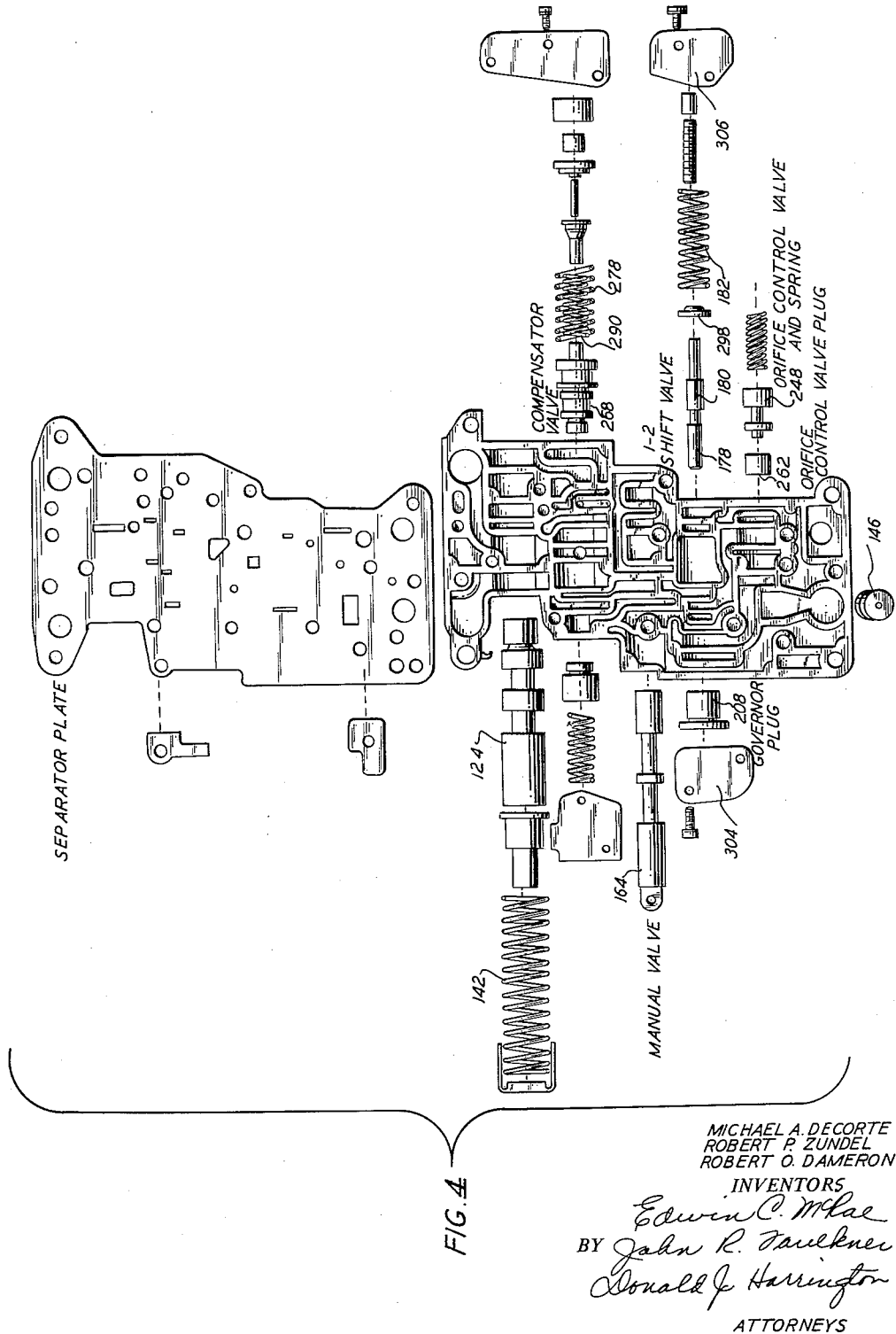

Our invention relates generally to an improved automatic control system for a servo control mechanism and more particularly to a simplified fluid pressure distributor valve construction for use in an automatic control valve circuit.

Our improved valve construction is particularly adapted to be used in a control circuit for an automatic power transmission mechanism although it is also capable of other uses.

We are aware of several control valve circuits for commercially manufactured automotive power transmission mechanisms which embody a movable shift valve for controlling the distribution of fluid pressure to various transmission clutch and brake servos whereby an automatic shift from one operating speed ratio to another may be initiated. The shift valve is usually subjected to a vehicle speed sensitive pressure signal and to a second pressure signal which is a function of engine torque demand. The shift valve is comprised of a multiple land valve spool and the design requirements usually necessitate a variation in the diameters of the valve lands on the shift valve spool.

The shift valve mechanism in a conventional automotive transmission control circuit is normally located in a main control valve body together with the valves which perform other control functions. Also, a pressure reducing valve is also provided in the circuit for the purpose of modulating the torque demand sensitive pressure signal, and the shift valve spool is subjected to this modulated pressure.

The pressure reducing valve may form a part of the shift valve mechanism, but since the diameter is smaller than the diameter of the adjacent valve land on the shift valve spool, it is usually contained within an auxiliary valve body secured to the main valve body. In the alternative, a valve sleeve may be inserted in the valve opening for the shift valve spool after the latter is assembled, and the pressure reducing valve may then be disposed within this valve sleeve. Both of these arrangements are relatively complex and they greatly increase the number of manufacturing problems due to the additional porting and passages which are required.

We have overcome these disadvantages in the improved valve construction of our instant invention by providing a valve spool formed in multiple sections which can be contained within the main valve housing. The valve chamber for the multiple sections extends through the valve body and the various sections of the valve spool may be loaded into the valve chamber from each end thereof. In addition, provision is made for containing the throttle pressure modulator valve element within the valve chamber, and no auxiliary valve body or valve sleeve is required to accommodate the same.

The provision of an improved valve construction of the type above set forth being a principal object of our invention, it is a further object of our invention to provide a multiple piece shift valve assembly for use in an automatic control valve circuit wherein the shift valve assembly may be housed entirely within a single valve body together with the other valve elements of the circuit.

It is a further object of our invention to provide a multiple piece shift valve assembly of the type above set forth wherein the individual parts thereof are formed with valve lands which cooperate with mating valve lands formed directly in the valve body in the valve chamber.

It is a further object of our invention to provide a valve assembly of the type above set forth wherein provision is made for subjecting the valve spool to differential fluid pressure and for applying a spring pressure to the same to oppose and balance the fluid pressure forces.

It is a further object of our invention to provide a valve assembly of the type set forth in the preceding object wherein a spring element may be assembled in the valve chamber, a suitable access opening being provided in the shift valve assembly to permit side entry of the valve spring.

It is a further object of our invention to provide a shift valve assembly of the type above described wherein the valve body and the associated valve chambers may be formed by means of a die casting operation.

For the purpose of more particularly describing the improvement of our instant invention, reference will be made to the accompanying drawings, wherein:

FIGURE 3 is an assembly view of the shift valve construction of FIGURE 2; and

FIGURE 4 shows an exploded view of a part of the valve body and valve assembly. The structure in FIGURE 4 is shown schematically in FIGURES 2 and 3.

Figure 1:
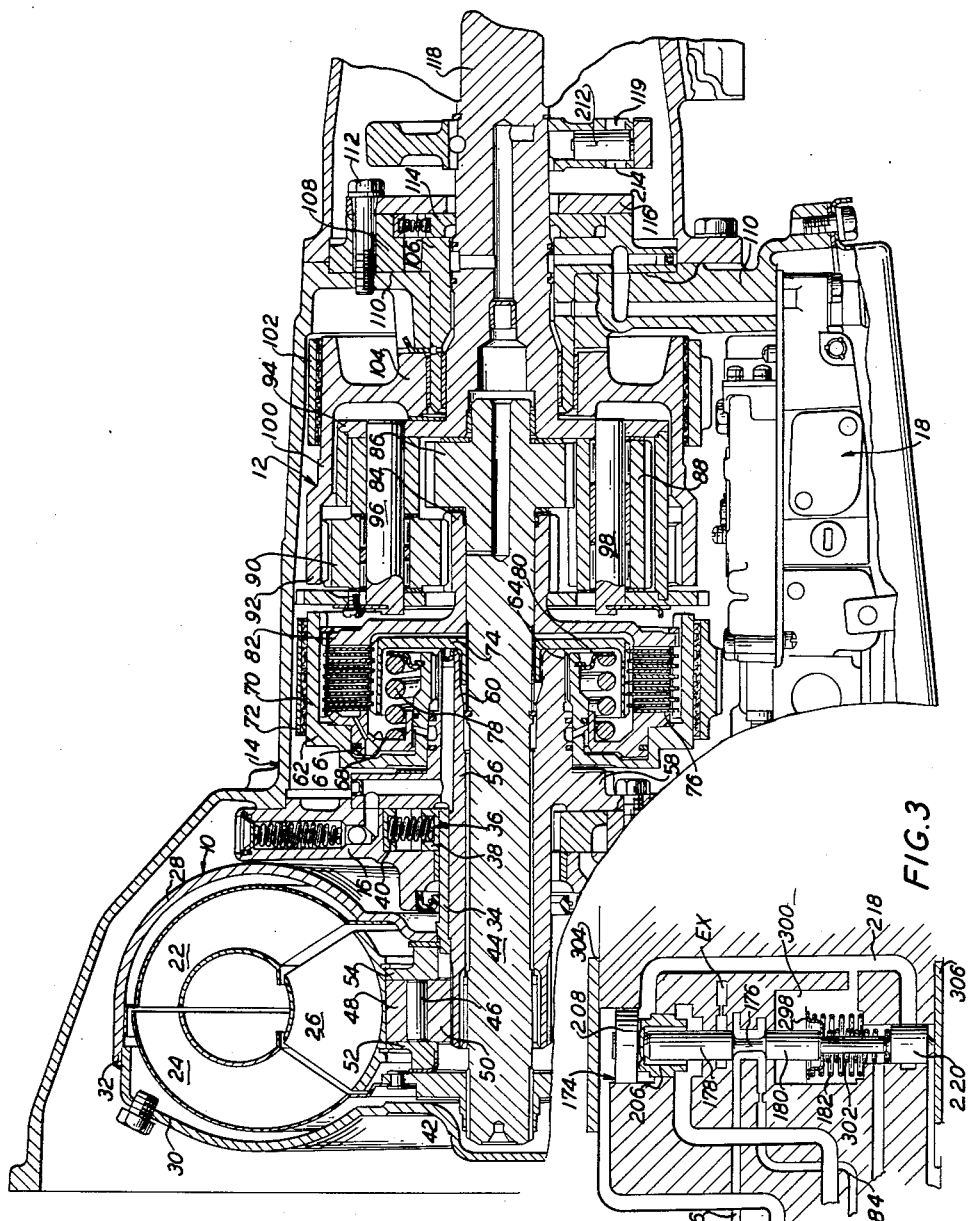
FIGURE 1 shows a longitudinal cross sectional view of a planetary gear power train mechanism in which the relative motion of the gear elements may be controlled by a control system of which the valve construction of our instant invention forms a part.

Referring first to FIGURE 1, the transmission mechanism comprises a hydrokinetic torque converter generally designated by numeral 10 and a compound planetary gear unit generally designated by numeral 12. The converter 10 and the gear unit 12 are situated in spaced portions of a common transmission casing 14, said spaced portions being separated by a wall 16. The automatic control mechanism for the transmission is generally designated by the numeral 18 and it is situated in a lower region of the transmission assembly which defines a sump 20 containing a supply of fluid for the control mechanism 18.

The torque converter 10 comprises a pump member 22, a turbine member 24 and a reactor member 26, said converter members each comprising a plurality of fluid flow directed blades disposed in angularly spaced relationship about the geometric axis thereof. The blades for the respective converter members are joined by inner and outer shrouds which define a toroidal fluid flow path for accommodating a circulation of the work performing fluid. The pump member 22 includes a pump shell 28 secured to a drive plate 30 by means of a continuous peripheral weld 32. The drive plate 30 in turn may be connected to the crankshaft of the vehicle engine, not shown.

The inner periphery of pump shell 28 is secured to a supporting shaft 34 which extends axially into a cooperating opening formed in wall 16 of the transmission casing. A positive displacement pump is positioned within a suitable pump recess formed in wall 16 as indicated at 36. The pump illustrated in FIGURE 1 is of the slipper type although other forms of positive displacement pumps may be used, such as a gear pump having cooperating internal and external gears. The pump 36 includes a rotor 38 having peripheral slots within which slippers 40 are situated, said slippers forming the working elements of the pump mechanism as the rotor 38 is driven by the shaft 34. It is thus apparent that the pump 36 will be continuously driven by the vehicle engine in a direct and positive fashion during operation of the transmission mechanism.

The outer shroud for the turbine member 24 is positively connected to a hub member 42 which in turn is splined to an intermediate power delivery shaft 44.

The radially inward shroud for reactor member 26 is formed with a central opening within which is positioned an overrunning brake 46 having inner and outer races 48 and 50, respectively. Thrust elements 52 and 54 are disposed on either side of the overrunning brake 46 as indicated. The inner race 50 of the overrunning brake 46 is splined to a stationary reactor shaft 56 which is formed integrally with a stationary adaptor 58. Adaptor 58 in turn is secured to the wall 16 and forms a closure for the pump chamber of the pump 36. Wall 16 also includes an extension 60 which forms the bearing support for a clutch cylinder member 62, a suitable bushing 64 being provided for this purpose.

The member 62 defines an annular cylinder 66 within which is positioned a cooperating annular piston 68. The periphery of member 62 defines a brake drum 70 about which a brake band 72 is disposed.

A clutch member 74 is splined to shaft 44 and the periphery thereof is adapted to carry clutch discs as indicated, said clutch member 74 and the clutch discs being formed with cooperating internal splines in a conventional fashion. The interior portion of the brake drum 70 is internally splined and externally splined clutch discs cooperate therewith to partly define a multiple disc clutch assembly. The discs carried by clutch member 74 and the discs secured to drum 70 are situated in alternate relationship and the assembly defined thereby is identified by numeral 76.

The piston 68 is normally urged in a left-hand direction, as viewed in FIGURE 1, by a clutch return spring 78, said spring being seated on a spring seat element 80. The piston 68 and the cooperating cylinder define a working chamber and pressurized fluid may be admitted into this chamber through suitable internal passages to create a clutch energizing force.

A second clutch member 82 is positively connected to element 70 and it acts as a reaction element for the multiple disc clutch assembly 76.

The gear unit 12 comprises a pair of sun gears of differential diameter. The smaller of the sun gears is connected to clutch member 82 and is designated by numeral 84. The other sun gear, which is shown at 86, is formed on or joined to shaft 44 in adjacent relationship relative to sun gear 84. The gear unit 12 further includes compound planetary gears consisting of long planet pinions 88 and short planet pinions 90. The planet pinions 90 are drivably engaged with sun gear 84 and with a ring gear shown at 92 and the short planet pinions 88 engage sun gear 86. Planet pinions 88 and 90 are also in mesh with each other. Both the planet pinions 88 and 90 are carried by a common carrier assembly identified by numeral 94, the carrier assembly including pinion shafts 96 and 98 upon which pinions 92 and 90, respectively, are rotatably journaled.

The ring gear 92 forms a part of a brake member in the form of a drum 100 and a reaction brake band 102 is disposed about drum 100. As already indicated, suitable servos are provided for each of the brake bands 72 and 102 and these servos will subsequently be described.

The brake drum 100 includes a hub portion 104 journaled on an extension 106 which in turn forms a part of an adaptor 108. The transmission casing 14 includes an end wall 110 and the adaptor 108 may be secured thereto by suitable bolts 112.

The adaptor 108 is recessed to define a pump chamber for accommodating a pump mechanism 114 of the positive displacement type and a closure plate 116 is provided for enclosing the pump chamber. The pump mechanism 114 may be similar in form to the above described pump 36, and the driving element thereof is positively keyed or otherwise secured to the transmission tailshaft, which is identified in FIGURE 1 by numeral 118. The tailshaft 118 in turn extends to the rear of the transmission mechanism and is journaled within the extension 106. The carrier assembly 94 of the planetary gear unit 18 is positively connected to tailshaft 118 to form a power output connection. A governor valve assembly 120 is positively connected to tailshaft 118 in order to provide a tailshaft speed signal for control purposes, said valve 120 forming a portion of the automatic control circuit subsequently to be described.

The transmission mechanism illustrated in FIGURE 1 is capable of providing two forward driving speed ratios and a reserve driving ratio. To condition the transmission mechanism for a low speed driving ratio of maximum torque multiplication, the brake band 70 may be energized thereby anchoring sun gear 84, the clutch disc 76 and brake band 102 being de-energized. The engine torque delivered to pump member 82 establishes a toroidal circulation in the converter and this results in an increased turbine torque which is transferred directly to sun gear 86 through the power delivery shaft 44. Sun gear 86 drives pinions 88 and the driving motion thereof is transferred to the transmission pinions 90. Since sun gear 84 is held stationary, the rotary motion of pinions 90 causes the carrier assembly 94 and the tailshaft 118 to rotate in a forward direction at a reduced speed ratio.

To obtain a second speed direct drive operation the brake band 72 is disengaged and the clutch disc assembly 76 is energized, the operation of the brake band 72 and the clutch disc assembly 76 being synchronized by the automatic control system in a fashion which will be subsequently described. After clutch disc assembly 76 is sufficiently energized, the sun gears 84 and 86 become locked together for joint movement. It is thus apparent that the elements of the planetary gear unit 12 will turn as a unit to establish a direct drive connection between turbine member 24 and tailshaft 118.

To obtain reverse drive, the brake band 72 and the clutch disc assembly 76 are both de-energized and the brake band 102 is energized. The ring gear 92 is therefore held stationary by brake band 102 and the turbine torque which is transferred to sun gear 86 tends to rotate pinions 88. The rotary motion of pinions 88 is transferred to pinions 90 and since the transmission sun gear 92 is held stationary, the pinions 90 tend to ride around ring gear 92 in a reverse direction, thereby providing a reverse driving torque to carrier assembly 94 and tailshaft 118.

Figure 2:
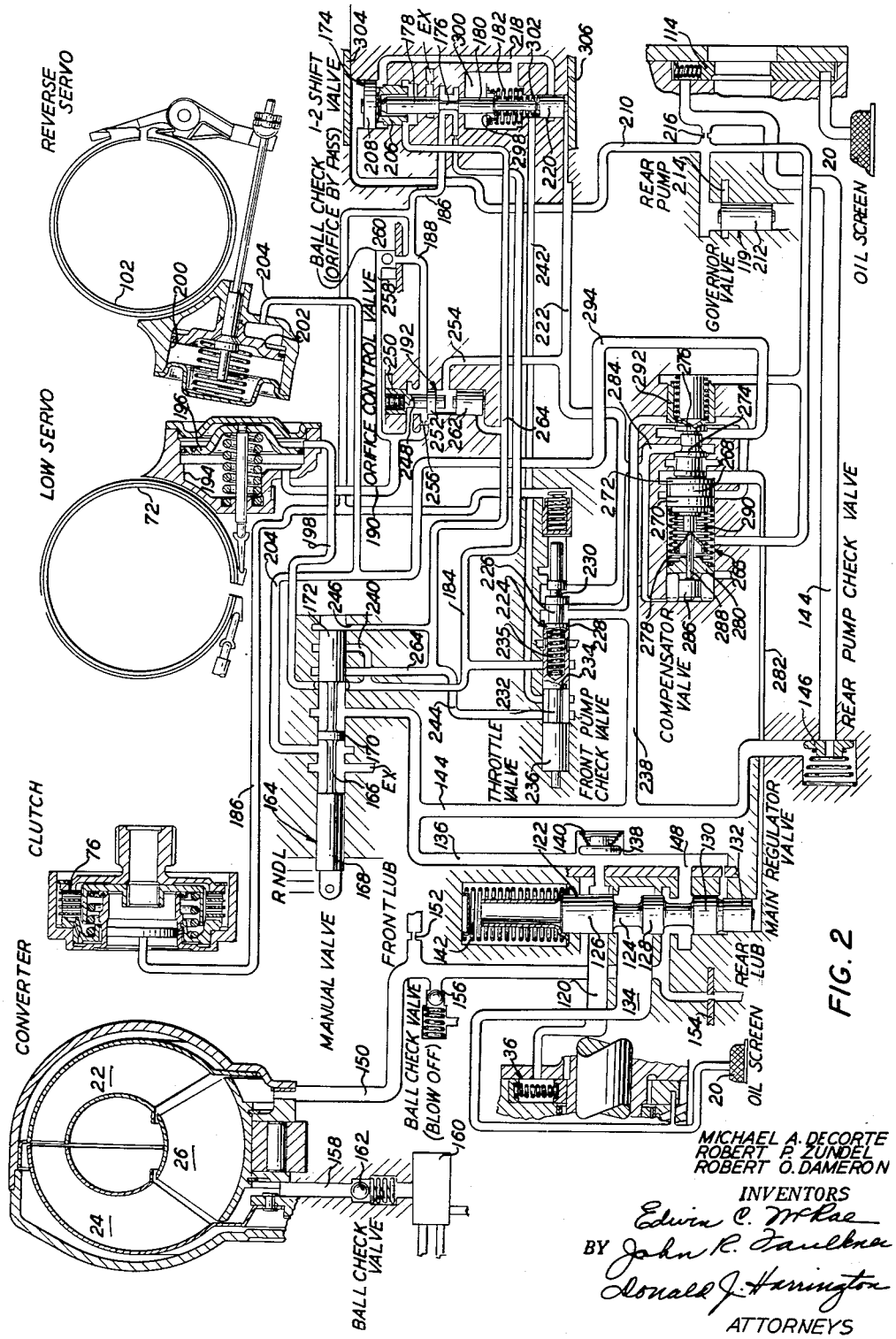
FIGURE 2 is a schematic diagram of an automatic control system embodying the improved valve construction of our instant invention. This control system is adapted to be used with the transmission structure illustrated in FIGURE 1.

Referring next to FIGURE 2, the principal components of the automatic control circuit for the transmission mechanism of FIGURE 1 are identified by appropriate labels. The engine driven pump 36 is provided with a discharge passage 120 and the intake side of pump 36 communicates with the aforementioned sump 20. An oil screen may be provided around the oil intake passage for the pump 36 as indicated.

A main regulator valve is generally identified by numeral 122 and it comprises a multiple land valve spool 124 slidably situated within a cooperating valve opening, said valve spool 124 having spaced valve lands identified by numerals 126, 128, 130 and 132. The passage 120 communicates with the valve chamber of the regulator valve 122 and valve land 126 controls the degree of communication between passage 120 and an exhaust passage 134. Passage 120 also communicates with a control pressure passage 136 and a one-way check valve 138 is provided, as shown, for establishing direct fluid communication between passages 120 and 136. Check valve 138 is normally urged toward a closed position by a valve spring 140 as indicated.

The fluid pressure transferred to pressure passage 136 is redirected to the regulator valve chamber at a region between valve lands 128 and 130 and between valve lands 130 and 132. The diameter of valve land 132 is smaller than the adjacent valve land 130 and the control pressure in passage 136 is therefore effective to force the valve element 134 in an upward direction. This upwardly directed pressure force opposes and balances a downwardly directed spring force established by valve spring 142 which acts directly on the valve spool 124. It is thus apparent that the pressure established in passages 120 and 136 will be determined by the valve spring 142.

The discharge side of the tailshaft driven pump 114 communicates with control passage 136 through a passage 144. A one-way check valve generally designated by numeral 146 is situated in passage 144 and is adapted to accommodate the transfer of pressurized fluid from the pump 114 to passage 136 and to inhibit the transfer of pressurized fluid in the opposite direction. Valve 146 normally assumes a closed position under the influence of spring pressure.

Under those operating conditions in which the discharge pressure for the pump 36 is greater than the discharge pressure for pump mechanism 114, the one-way check valve 146 will be closed and one-way check valve 138 will be opened, and pressure regulation by the regulator valve 122 will be effected by valve land 126. However, under those driving conditions in which the discharge pressure for pump mechanism 114 is greater than the discharge pressure for pump 36, the check valve 138 will assume a closed position and check valve 146 will be opened. Communication is therefore established between passages 144 and 136, thereby permitting the pump mechanism 114 to supply the pressure requirements for the entire circuit. Under these conditions the control pressure in passage 136 is distributed to the regulator valve chamber in the region between valve lands 128 and 130, a suitable port 148 being provided for this purpose.

As soon as valve 138 closes, the valve spool 124 will be shifted in an upward direction so that valve land 128 will control the degree of communication between port 148 and the exhaust passage 134. Upon movement of the valve spool 124 to an upward position in this fashion, valve land 126 is shifted so that the discharge passage 120 is brought into direct communication with exhaust passage 134, thereby rendering the pump 36 inoperative. Since the pump 36 operates with a substantially zero pressure differential, a considerable saving in pumping horsepower is obtained.

It is contemplated that the pump mechanism 114 will be capable of supplying the total requirements of the circuit only at very high speeds during operation in the aforementioned direct drive ratio. However, the check valve 146 and the check valve 138 may both be opened during operation at an intermediate speed range so that the pump mechanism 114 will supplement the operation of the pump 36.

The hydrokinetic torque converter 10 is supplied with fluid by means of a converter supply passage 150 with the regulator valve chamber at a location adjacent valve land 128. Passage 150 is therefore brought into communication with passage 136 through port 138. Passage 150 also supplies the lubricating passages in the transmission mechanism as schematically shown at 152 and an orifice 154 is disposed between passage 150 and the exhaust region in order to maintain a desired back pressure in passage 150. The magnitude of the back pressure is controlled by a pressure relief valve 156.

A converter fluid return passage is shown at 158 and it communicates with an oil cooler 160 through a check valve mechanism 162.

Passage 136 extends to a manual valve generally shown at 164, said manual valve including a valve spool 166 having spaced valve lands 168, 170 and 172, the passage 136 communicating with the manual valve at a region between valve lands 170 and 172.

The manual valve 164 may be adjusted to any of several operating positions to select the various drive ranges, said drive ranges being identified by the symbols R, N, D and L which respectively correspond to reverse, neutral, drive and low. When the valve spool 166 assumes the position shown in FIGURE 2, the transmission will be conditioned for operation in drive range.

The improved valve construction of our instant invention is referred to in the diagram of FIGURE 2 as the 1-2 shift valve and it is identified by numeral 174. This shift valve comprises a valve element 176 having spaced valve lands 178 and 180, the diameter of the latter being slightly greater than the diameter of the former. Valve element 176 is situated in a cooperating valve chamber and it is urged in an upward direction as viewed in FIGURE 2 by a valve spring 182. A passage 184 extends from the manual valve chamber to an intermediate region of the shift valve chamber and when the manual valve is in the position shown, passage 184 is in communication with passage 186 so that the former is subjected to control pressure.

When the valve element 176 assumes the position shown in FIGURE 2, communication is established between the passage 184 and passage 186, the latter extending to the fluid pressure operated servo for the multiple disc clutch assembly 76. Passage 184 also communicates with a passage 188 which in turn communicates with a passage 190 through an orifice control valve generally identified in FIGURE 2 by numeral 192. The passage 190 in turn communicates with one side of a fluid pressure operated servo for the brake band 72. This servo comprises a cylinder 194 and a cooperating piston 196, said piston and cylinder cooperating to define a pair of opposed working chambers. The piston 196 is connected to the brake band 72 and is spring urged to a retracting position as indicated.

The aforementioned passage 190 communicates with the working chamber on the release side of the piston 196. The working chamber on the apply side of piston 196 communicates with a passage 198 which extends to the manual valve and which communicates with control pressure passage 186 through the manual valve. It is thus apparent that when both of the opposed working chambers of the brake servo defined by cylinder 194 and piston 196 are pressurized, the brake band 192 will be released. However, when the working chamber on the release side of the piston 196 is exhausted, the brake band 72 will be applied.

The brake band 102 is also energized by means of a fluid pressure operated servo which is defined by a cylinder 200 and a cooperating piston 202. The piston 202 is mechanically connected to the brake band and is normally urged toward a released position by a brake release spring as indicated. The piston 202 and the cylinder 200 define a working chamber which communicates with a passage 204 extending to the manual valve spool. When the manual valve spool 166 is in the position shown, passage 204 communicates with the manual valve chamber between valve lands 168 and 170 which in turn is exhausted through an associated exhaust port as indicated.

The shift valve 174 includes a portion 206 situated at the upper end of valve element 176 which includes a relatively large diameter valve land 208. The upper side of land 208 is subjected to a vehicle speed sensitive governor pressure which is supplied thereto by a communicating passage 210, said passage extending to the previously described governor valve mechanism generally designated by the numeral 119.

As best seen in FIGURE 1, valve mechanism 119 comprises a valve element 212 situated in the previously described opening on one side of the axis of rotation of tailshaft 118. The opening in which valve element 212 is situated communicates with an exhaust port 214 and the valve element 212 is urged under the influence of centrifugal pressure to a radially outward position, thereby tending to close exhaust port 214. The opening for valve element 212 communicates with port 214 and the passage 210 extends thereto as indicated in FIGURE 2.

The passage 210 also communicates with passage 144 through a flow restricting orifice 216. The pressure in passage 210 exerts a radially inward force on valve element 212 which opposes and balances the centrifugal force acting in the opposite direction. It is apparent that communication between passage 210 and exhaust port 214 will be determined by the speed of rotation of the tailshaft, and the pressure in the passage 210 will be a function of the tailshaft speed. The orifice 216 establishes the desired amount of back pressure in passage 144 so that pump mechanism 114 may be utilized as a source of control pressure as previously described. This is important during reverse drive operation.

The governor pressure force acting on shift valve 174 is opposed by a modulated throttle pressure force which acts in an upward direction on valve land 180 and on a differential area formed on the lower side of land 208. Pressure is distributed to the region of the valve land 180 and land 208 through modulated throttle pressure passage 218.

A throttle pressure modulator valve element is shown at 220 and it is urged in a downward direction, as seen in FIGURE 2, by a valve spring which acts against the valve element 176. Throttle pressure is distributed to one side of the modulator valve 220 through a modulated throttle pressure passage 222 and when the shift valve 176 assumes an upward position, the modulator valve 220 is used to establish communication between passages 222 and 218 thereby creating a reduced or modulated throttle pressure in passage 218. It is this reduced throttle pressure which is utilized for determining the shift point. The shift point or the speed at which the transmission mechanism is shifted from the low speed ratio to the high speed, direct drive ratio will be delayed by reason of the pressure force exerted by the modulated throttle pressure and the degree of this delay depends upon the degree to which the throttle pressure is modulated.

The previously mentioned throttle pressure in passage 222 is produced by a throttle valve mechanism generally identified by numeral 224. This valve mechanism 224 comprises a valve spool 226 having spaced valve lands 228 and 230. Valve mechanism 224 further includes a downshift valve element 232 having spaced valve lands 234 and 236. A spring 235 is interposed between valve elements 232 and 236 so that when the former is adjusted, a valve actuating force will be transmitted to valve element 226. The movement of valve 232 is proportional to engine throttle movement and a mechanical connection between the engine throttle and valve element 232 may be provided for obtaining this adjustment.

Control pressure is distributed to the throttle valve mechanism by the lands 228 and 230 by means of a passage 238, and valve land 230 is adapted to control the degree of communication between passage 238 and the aforementioned throttle pressure passage 222. An annular working area is formed on one side of valve land 230 on which the pressure in passage 222 is caused to act. This creates a pressure force which opposes and balances the force supplied by valve spring 235. Movement of the engine throttle toward a wide open position will cause compression of spring 235 and this results in a high throttle pressure in throttle pressure passage 222. It is thus apparent that the magnitude of the throttle pressure in passage 222 will be proportional to engine torque demand.

For the purpose of explaining the mode of operation of that portion of the control circuit thus far described, it will be assumed that the selector valve is positioned as shown in FIGURE 2 and that the vehicle is operated from a standing start. The governor pressure in passage 210 will be zero when the vehicle is stationary, and if the engine throttle is relaxed the throttle pressure in passage 222 is also substantially zero. Since the shift valve element 176 assumes an upward position, passage 186 is exhausted through the exhaust port associated with the shift valve 174 and the clutch servo and the working chamber on the release side of the brake servo piston 196 are both exhausted, the latter communicating with passage 190 through passages 186 and 188 as previously explained. The working chamber on the apply side of the piston chamber 196 is pressurized by means of passage 198 and therefore the low speed brake band 72 is applied.

If the operator then depresses the engine throttle, engine torque will be transmitted through the converter 10 and through the gear unit 12 in the manner previously described to provide an over-all driving ratio with maximum torque multiplication. Operation in the low speed driving ratio continues until the magnitude of the governor pressure in passage 210 is sufficient to cause the shift valve element 176 to move in a downward direction against the opposing force of valve spring 182 and the modulated throttle pressure force. The valve element 176 will then shift to the position shown in FIGURE 2 and the vehicle speed at which this shift occurs will be determined by the engine throttle setting.

After the valve element 176 assumes the position shown, communication is established between passages 184 and 186 thereby causing the servo for the clutch 76 to be energized and the pressure chamber on the release side of the brake servo piston 196 to be concurrently pressurized. Since the clutch assembly 76 becomes energized in sequence with engagement of brake band 22, the transmission is conditioned for direct drive operation.

If it is desired to operate the transmission in reverse, manual valve spool 166 can be shifted to the reverse position and passage 198 becomes exhausted through an exhaust port 240 which becomes uncovered by valve land 72. Control pressure passage 136 is brought into direct communication with passage 204 and the working chamber defined in part by numeral 202 of the reverse piston circuit is therefore pressurized to apply the reverse brake band 102. The clutch assembly 76 is de-energized since the passage 186 is exhausted through the exhaust port associated with shift valve 174, the valve element 176 assuming an upward position during reverse drive operation under the influence of the spring and modulated throttle pressure forces. Since the clutch assembly 76 and the brake band 72 are released while the brake band 102 is applied, the transmission is in condition for reverse drive operation as previously explained in the description of the transmission structure shown in FIGURE 1.

When the shift valve moves to the direct drive position as indicated in FIGURE 2 during a shift from low speed operation to normal drive operation, the valve element 176 causes the modulator valve element 220 to move in a downward direction and to block passage 218 while opening passage 242. Passage 242 extends to the throttle valve mechanism and it communicates therethrough with a passage 244 extending to an exhaust port 246 in the manual valve 164. It is thus apparent that the upwardly directed modulated throttle pressure forces which act on the shift valve element 176 prior to the shift to the direct drive position are terminated, and the shift valve 174 will therefore maintain a direct drive position until the governor pressure becomes sufficiently reduced in magnitude to permit the valve 176 to move in an upward direction under the influence of spring pressure and the throttle pressure force on valve element 220. The vehicle speed at which this shift to the upward or low speed position occurs will be substantially less than the vehicle speed at which a shift will occur from a low speed upward position to the direct drive downward position.

It is desirable to delay the application of the low speed brake band 72 during a downshift from direct drive to the low speed ratio under a zero throttle condition. This prevents an undesirable roughness when the brake band 72 is applied. This delay is accomplished by the previously mentioned orifice control valve 192 which comprises a valve spool 248 having spaced valve lands 250 and 252. Valve spool 248 is urged in a downward direction by a suitable valve spring. The valve spool 248 is slidably positioned in the valve chamber and the lower end thereof is subjected to throttle pressure by means of a passage 254. Whenever the engine is under torque, the throttle pressure is sufficient to maintain spool 248 in the position shown and then free communication is established through orifice control valve 192 between passages 188 and 190. However, under zero throttle conditions the throttle pressure becomes reduced to zero and the valve spool 248 is moved in a downward position under the influence of the associated valve spring. When this occurs, passage 188 communicates with passage 190 only through a bypass orifice shown at 256. Whenever a downshift occurs under zero throttle conditions the pressurized fluid in the pressure chamber on the release side of the brake servo piston 196 must be exhausted through the orifice 256 and this delays the application of the brake band 272 relative to the time interval required to de-energize the clutch assembly 76.

It is not desirable to restrict the degree of communication between passages 188 and 190 during a light throttle upshift since this would cause an undesirable overlap between the engagement of the clutch assembly 76 and the disengagement of the brake band 72. During such a light throttle upshift the valve spool 248 would normally assume a downward position and would normally provide such a restriction. I have therefore provided a passage 258 which bypasses the orifice control valve 192 and which permits pressurized fluid to pass directly from passage 186 to passage 190 and into the working chamber on the release side of the brake servo piston 196. I have therefore provided a one-way check valve as shown at 260 to accommodate this direct transfer of pressurized fluid to the brake servo. During the above described zero throttle downshift the check valve 260 is effective to inhibit a bypass flow through passage 258 and the orifice 256 provides the only exhaust path for the fluid chamber on the release side of the brake servo piston 196.

It is undesirable to allow the orifice control valve 192 to restrict the fluid exhaust path for the low speed brake servo when the vehicle is traveling at relatively high speeds and when the manual valve is shifted to a low range position indicated by the symbol "L." I have therefore provided a piston element 262 in the lowermost portion of the valve chamber for the orifice control valve 192. The lower end of the piston element 262 is subjected to control pressure when the manual valve assumes the low range position and this control pressure is distributed to the orifice control valve through passage 264. It is thus apparent that whenever the manual valve is shifted to the low range position, the orifice control valve element 248 will be held in the upward position regardless of the engine throttle position or the magnitude of the engine throttle pressure. The brake band 72 may therefore be quickly applied as the clutch assembly 76 is disengaged. This prevents an undesirable slippage of the friction elements.

As previously indicated, the transmission may be conditioned for continuous operation in the low speed drive range by moving the manual valve to the low range position and this causes valve land 172 to uncover passage 264 so that the latter will communicate directly with control pressure passage 136 through the manual valve. Passage 264 also communicates with the lower end of a portion 206 of shift valve 174, thereby urging the same in an upward or low speed position. Control pressure is also distributed from passage 264 to passage 244 and through the throttle valve mechanism to passage 242. This causes control pressure to be distributed to the lower end of valve land 180 and to the working area on the lower side of land 208. This causes an additional pressure force which urges the shift valve 174 to a low speed position. Passage 186 is therefore brought into direct communication with the exhaust port associated with shift valve 174 and the clutch assembly 76 is exhausted directly into passage 186. Similarly, the working chamber on the release side of the brake piston 196 is exhausted through passages 190, 188 and 186, the orifice control valve 192 assuming an upward position under these conditions as previously explained.

In order to maintain a smooth shift pattern and to maintain the required torque capacity for the various clutch and brake servos, it is desirable to vary the magnitude of the control pressure in accord with the operating torque demands. For this reason a compensator valve mechanism has been included in the circuit, as indicated at 266. This mechanism comprises a multiple land valve element 268 which is positioned in a cooperating valve opening and which is formed with a plurality of opposed valve lands shown at 270, 272, 274 and 276. The valve element 268 is urged in a right-hand direction by compensator valve spring 278 which in turn is seated on a closure member 280. The region occupied by the spring 278 is subjected to governor pressure by means of passage 210 which communicates therewith. Control pressure is distributed to the compensator valve chamber at a point intermediate valve lands 270 and 272, the valve land 272 supplying controlled communication between passage 278 and a compensator pressure passage 282. Throttle pressure is conducted to the right side of valve element 268 through a passage 284 and it acts on an annular differential area between valve lands 274 and 276. Throttle pressure is also conducted to the left side of the compensator valve assembly and it acts upon the end of a valve piston element 286. A force transfer member 288 is movably mounted in closure member 280 and is adapted to engage valve piston element 286. The force transfer member 288 is urged in a left-hand direction by an inner valve spring 290 which is seated at one end thereof on a spring seat element that contacts the member 288. The other end of spring 290 acts on valve element 268.

It is thus seen that the governor pressure force and the force of spring 278 acting in a right-hand direction on the compensator valve element 268 will be balanced and opposed by the throttle pressure force acting in a left-hand direction on valve land 274. This leftward throttle pressure force is supplemented by the force of the compensator pressure in passage 282 which acts on the right side of land 272. The compensator valve element 268 therefore acts as a pressure regulator and the compensator pressure which is produced in passage 282 will be a function of both governor pressure and throttle pressure. The compensator pressure is transferred to the lower end of valve land 132 on the regulator valve spool 124 and urges the same in an upward direction. After throttle pressure is increased in response to an increased engine torque demand for any given vehicle speed, the compensator valve element 268 will be urged in a leftward direction to decrease the degree of communication between passages 238 and 282. This results in a decreased compensator pressure and the valve land 126 on the regulator valve spool 124 will therefore provide an increased degree of communication between passages 120 and 134. This results in an increased control pressure which is sufficient to increase the torque transmitting capacity of the clutch and brake servos to accommodate the increased torque which normally accompanies an increased engine throttle setting. On the other hand, after the vehicle speed increases for any given engine throttle setting, the net force acting on the valve element 268 in a right-hand direction is increased thereby increasing the degree of communication between passages 288 and 232. This increases the compensator pressure and this in turn increases the degree of communication between passages 121 and 134. This results in a decreased control pressure which is made available to the transmission clutch and brake servos and this decrease may be made to correspond to the inverse relationship between vehicle speed and engine torque.

The engine torque for any given vehicle speed is generally proportional to engine throttle setting during movement of the engine throttle from a zero throttle position to a throttle setting which is approximately 60 percent of the wide open throttle position. After this intermediate throttle setting is obtained, it is not desirable to allow the compensator pressure to become decreased since further throttle movement beyond this setting will not ordinarily correspond to an increased engine torque. A throttle pressure cut-out feature is therefore provided in the compensator valve mechanism. This cut-out feature is obtained by means of the above described valve piston element 286 and its associated spring 290. That is, when the engine throttle reaches an intermediate setting or approximately a wide open position, the throttle pressure will be of a sufficient magnitude to cause the valve piston element 286 to compress spring 290 and to cause the force transfer member 288 to engage compensator valve element 268. Upon a further increase in engine throttle setting, the increase in the throttle pressure force resulting from the corresponding increased throttle pressure will be transferred directly to the compensator valve spool and will oppose and balance the increased throttle pressure force acting in the left-hand direction on multiple land valve spool element 268. The compensator valve mechanism will therefore be rendered insensitive to changes in engine throttle setting beyond the limiting intermediate position.

A governor pressure cut-out feature is also incorporated in the compensator valve mechanism and this is provided by a valve piston element 292 situated on the right-hand side of compensator valve element 268. The element 292 is movably positioned in a cooperating valve chamber and is adapted to engage the end of the valve element 268. Governor pressure is caused to act on the right side of element 292 and the left side of element 292 is subjected to control pressure by means of passage 238 which communicates with the associated valve chamber at this point.

It is desirable to allow the control pressure to decrease as the vehicle speed increases beyond a predetermined value for any given engine throttle setting since the torque capacity of the clutch and brake servos would be insufficient to accommodate the necessary driving torque. The element 292 is therefore calibrated so that when a predetermined limiting vehicle speed is reached for any given throttle setting, the element 292 will be biased against the opposing forces into engagement with valve element 268. Further increases in vehicle speed will cause an increased governor pressure but the resulting increased governor pressure force acting on the left side of the valve element 268 will be opposed and balanced by an equal force acting on the element 292. The compensator valve mechanism is therefore rendered insensitive to changes in the vehicle speed after a predetermined speed is obtained for any given throttle setting.

It is necessary to increase the control pressure in the circuit during operation of the transmission in reverse since the torque requirements of the reverse brake servo are relatively high. For this reason control pressure is transferred to the right side of valve land 276 of the compensator valve element 268 by means of passage 294. The passage 294 communicates with passage 204 so that it is pressurized whenever the transmission is conditioned for reverse drive operation. The pressure force acting on valve land 276 will supplement the valve forces acting in a left-hand direction on multiple land valve element 268 and will cause a decrease in the compensator pressure passage 282. This in turn will result in an increase in control pressure as previously explained.

Referring next to FIGURES 3 and 4, the 1–2 shift valve construction of FIGURE 2 is shown in more particular detail. The portion 206 is formed with a relatively large diameter and is situated over the upper end of valve element 176. Portion 206 and valve element 176 are engageable with each other and are urged in an upward direction by valve spring 182. The spring 182 is seated on a valve seat 298 which in turn is received over the lower end of valve element 176 and which cooperates with valve land 180. The other end of valve spring 182 acts against the lower end of an enlarged cavity 300. Another valve spring 302 is situated between valve land 180 and modulator valve element 220. The diameter of the valve element 220 is larger than the diameter of valve land 180.

The elements of the 1–2 shift valve construction may be situated in a die cast valve body together with the other valve elements of the circuit of FIGURE 2. The valve chamber for valve element 176 and for the enlarged portion 206 extends through the valve body and the above-described passages communicating with the valve chamber may be formed within the valve body so that they communicate with the other portions of the circuit in the manner described. The upper end of the valve chamber for the 1–2 shift valve is closed by an end closure plate 304 which may be secured to the valve body in a suitable fashion such as by bolts or screws. Similarly, another end closure plate 306 is secured to the valve body at the lower end of the valve chamber for the 1–2 shift valve.

It is apparent from the foregoing description that the valve element 176 and the enlarged portion 206 of the shift valve construction may be assembled in the valve chamber from opposite ends thereof. The valve lands 178 and 180 cooperate with internal valve elements formed in the valve body within the 1–2 shift valve chamber. The modulator valve element 220 is also situated within the 1–2 shift valve chamber and it may be end loaded during assembly after the valve element 176 has been positioned.

We contemplate that the enlarged cavity 300 may be formed during the die casting of the valve body itself. The cavity 300 permits side loading of the springs 182 and 302 and, after the shift valve has been completely assembled, the cavity 300 may be closed by a valve body cover plate 301 situated on the side thereof in a conventional fashion. During the assembly operation the springs 182 and 302 are positioned in place within the cavity 300 prior to the end loading of the valve element 176. The valve element 176 may then be positioned within the springs 182 and 302 and after the enlarged portion 206 and the valve element 220 have been end assembled in the valve chamber, as previously described, the cover plates 304 and 306 may be secured in place.

This valve construction eliminates the need for providing an auxiliary valve body for the valve element 220 and, although it is located within the same valve chamber with valve element 176, it does not require a separate valve sleeve.

Having thus described a preferred form of our invention, what we claim and desire to secure by United States Letters Patent is:

1. In an automatic control valve circuit, conduit structure, a unitary valve body, a fluid pressure distributor valve assembly situated in and partly defining said conduit structure, said distributor valve assembly including a valve chamber formed in said valve body and extending through the same, and internal valve lands defined by said valve body within said valve chamber, a bipartite valve element disposed in said valve chamber and having annular external valve lands cooperating with said internal valve lands, one part of said valve element having relatively reduced diameter portions and being adapted to be assembled into said valve chamber from one end thereof, another part of said valve element having relatively large diameter portions and being adapted to be assembled into said valve chamber from the other end thereof, said cooperating valve lands being adapted to control the distribution of fluid pressure in said conduit structure, passage means for subjecting one portion of said other valve element part to a first pressure signal, means for subjecting another portion of said other valve element part and said one valve element part to a second pressure signal, and a pressure modulator valve means disposed in said annular valve chamber for controlling the magnitude of said second pressure signal.

2. In an automatic control valve circuit, conduit structure, a unitary valve body, a fluid pressure distributor valve assembly situated in and partly defining said conduit structure, said distributor valve assembly including a valve chamber formed in said valve body and extending from one side to a second opposed side, annular internal valve lands defined by said valve body within said valve chamber, a bipartite valve element disposed in said valve chamber having annular external valve lands cooperating with said internal valve lands, one part of said valve element having relatively reduced diameter portions and being adapted to be assembled into said chamber from one end thereof, another part of said valve element having relatively large diameter portions and being adapted to be assembled into said valve chamber from the other end thereof, said cooperating valve lands being adapted to control distribution of fluid pressure in said conduit structure, passage means for subjecting one portion of said other valve element part to a first pressure signal, means for subjecting said one valve element part to a second pressure signal, a spring chamber formed in said valve body in the region of said valve chamber and communicating with the exterior of said valve body at a third side thereof, means disposed in said spring chamber for biasing said valve element in one direction, and pressure modulator valve means disposed in said valve chamber for controlling the magnitude of said second pressure signal.

3. In an automatic control valve circuit, conduit structure, a unitary valve body, a fluid pressure distributor valve assembly situated in and partly defining said conduit structure, said distributor valve assembly including a valve chamber formed in said valve body and extending from one side to a second opposed side, annular internal valve lands defined by said valve body within said valve chamber, a bipartite valve element disposed in said valve chamber having annular external valve lands cooperating with said internal valve lands, one part of said valve element having relatively reduced diameter portions and being adapted to be assembled into said chamber from one end thereof, another part of said valve element having relatively large diameter portions and being adapted to be assembled into said valve chamber from the other end thereof, said cooperating valve lands being adapted to control distribution of fluid pressure in said conduit structure, passage means for subjecting one portion of said other valve element part to a first pressure signal, means for subjecting said one valve element part to a second pressure signal, a spring chamber formed in said valve body in the region of said valve chamber and communicating with the exterior of said valve body at a third side thereof, spring means for biasing said valve element in one direction to supplement the pressure force of said second pressure signal, and pressure modulator valve means disposed in said valve chamber for controlling the magnitude of said second pressure signal.

4. In an automatic control valve circuit, conduit structure, a unitary valve body, a fluid pressure distributor valve assembly situated in and partly defining said conduit structure, said distributor valve assembly including a valve chamber formed in said valve body and extending from one side to a second opposed side, annular internal valve lands defined by said valve body within said valve chamber, a bipartite valve element disposed in said valve chamber having annular external valve lands cooperating with said internal valve lands, one part of said valve element having relatively reduced diameter portions and being adapted to be assembled into said chamber from one end thereof, another part of said valve element having relatively large diameter portions and being adapted to be assembled into said valve chamber from the other end thereof, said cooperating valve lands being adapted to control distribution of fluid pressure in said conduit structure, passage means for subjecting one portion of said other valve element part to a first pressure signal, means for subjecting said one valve element part to a second pressure signal, a spring chamber formed in said valve body in the region of said valve chamber and communicating with the exterior of said valve body at a third side thereof, spring means for biasing said valve element in one direction to supplement the pressure force of said second pressure signal, pressure modulator valve means disposed in said valve chamber for controlling the magnitude of said second pressure signal, said modulator valve means including a valve element disposed in said valve chamber adjacent said one end thereof, and a modulator valve spring interposed between said one valve element part and said modulator valve element.

5. In an automatic control valve circuit, conduit structure, a unitary valve body having a valve opening extending therethrough, a multiple piece valve element disposed in said valve chamber for controlling the distribution of fluid pressure in said conduit structure, means for subjecting said valve element to two fluid pressure signals, and modulator valve means located in said valve chamber for regulating the magnitude of one of said pressure signals, said unitary valve body defining valve lands within said valve chamber which cooperate with mating valve lands on said multiple piece valve element and on said modulator valve means.

6. In an automatic control valve circuit, a single piece valve body, a distributor valve chamber formed in said valve body and extending through the same to provide an end opening at each of two sides thereof, a two-part valve element disposed in said valve opening, one part of said valve element having a relatively large diameter and being adapted to be assembled in one end of said valve chamber, the other part of said valve element being adapted to be assembled in the other end of said valve chamber, passage means communicating with said valve chamber adjacent said one end thereof for distributing a first pressure signal thereto, a modulator valve means including a modulator valve element disposed in said valve chamber adjacent said other end thereof for reducing the magnitude of said first pressure signal whereby one part of said two-part valve element is subjected to an actuating fluid pressure of reduced magnitude, means for subjecting another part of said two-part element to a second pressure signal, and spring means for biasing said two-part valve element in one direction to oppose the pressure force established by said second pressure signal.

7. In an automatic control valve circuit, a single piece valve body, a distributor valve chamber formed in said valve body and extending through the same to provide an end opening at each of two sides thereof, a two-part valve element disposed in said valve opening, one part of said valve element having a relatively large diameter and being adapted to be assembled in one end of said valve chamber, the other part of said valve element being adapted to be assembled in the other end of said valve chamber, passage means communicating with said valve chamber adjacent said one end thereof for distributing a first pressure signal thereto, a modulator valve means including a modulator valve element disposed in said valve chamber adjacent said other end thereof for reducing the magnitude of said first pressure signal whereby one part of said two-part valve element is subjected to an actuating fluid pressure of reduced magnitude, means for subjecting another part of said two-part element to a second pressure signal, spring means for biasing said two-part valve element in one direction to oppose the pressure force established by said second pressure signal, and a spring chamber situated in said valve body in the region of said valve chamber, said spring chamber communicating with the exterior of said valve body at one side thereof, said spring means being situated in said spring chamber.

8. The combination as set forth in claim 7 wherein said modulator valve means includes a valve spring interposed between the other part of said two-part valve element and said modulator valve element whereby the latter is subjected to a calibrated spring force.

References Cited in the file of this patent

UNITED STATES PATENTS

| | | |
|---|---|---|
| 2,606,739 | Gardner | Aug. 12, 1952 |
| 2,632,470 | Livers et al. | Mar. 24, 1953 |
| 2,804,751 | Schroeder | Sept. 3, 1957 |
| 2,895,298 | Jania | July 21, 1959 |